US008072736B2

(12) United States Patent
Roosdorp et al.

(10) Patent No.: US 8,072,736 B2
(45) Date of Patent: Dec. 6, 2011

(54) MOVABLE ELECTRICAL POWER DISTRIBUTION ASSEMBLY

(75) Inventors: Joannes Willen Maria Roosdorp, Braganca Paulista/SP (BR); Andre Metzker, Itatiba/São Paulo (BR); Emerson Eduardo Grando, Braganca Paulista/SP (BR)

(73) Assignee: Tyco Electronics Brasil Ltda, Sao Paulo (BR)

( * ) Notice: Subject to any disclaimer, the term of this patent is extended or adjusted under 35 U.S.C. 154(b) by 68 days.

(21) Appl. No.: 12/180,884

(22) Filed: Jul. 28, 2008

(65) Prior Publication Data

US 2010/0020474 A1  Jan. 28, 2010

(51) Int. Cl.
*H05K 7/20* (2006.01)
(52) U.S. Cl. ........ 361/645; 361/628; 361/646; 361/647; 361/652; 439/76.2; 439/157; 337/186
(58) Field of Classification Search ............ 361/600, 361/610, 622, 626, 628, 641–647, 652
See application file for complete search history.

(56) References Cited

U.S. PATENT DOCUMENTS

| | | | |
|---|---|---|---|
| 5,032,087 A * | 7/1991 | Koiner et al. | 439/341 |
| 5,156,551 A | 10/1992 | Unger et al. | |
| 6,217,354 B1 * | 4/2001 | Fencl et al. | 439/157 |
| 6,361,336 B1 * | 3/2002 | Zhao et al. | 439/157 |
| 6,558,190 B1 | 5/2003 | Pierson | |
| 6,641,423 B1 * | 11/2003 | Giro | 439/347 |
| 6,739,889 B1 * | 5/2004 | Daggett et al. | 439/157 |
| 6,824,406 B1 * | 11/2004 | Sharples et al. | 439/157 |
| 6,848,946 B2 * | 2/2005 | Vicenza et al. | 439/620.29 |
| 6,887,089 B2 * | 5/2005 | Nishide | 439/157 |
| 2007/0054528 A1 | 3/2007 | Caveney et al. | |
| 2008/0053698 A1 * | 3/2008 | Purves et al. | 174/520 |

FOREIGN PATENT DOCUMENTS

| | | |
|---|---|---|
| EP | 1 152 490 | 11/2001 |
| WO | WO 92/15129 | 9/1992 |

OTHER PUBLICATIONS

International Search Report, International Application No. PCT/US/2009/004193, International Filing Date Jul. 20, 2009.

* cited by examiner

*Primary Examiner* — Courtney Smith (57) ABSTRACT

An electrical power distribution assembly for providing enhanced access includes a first member configured to be mounted to a fixed structure. A second member is configured to receive electrical components for interconnection to electrical systems of a predetermined configuration. The second member is movably connected to the first member between a first position and a second position. The movable connection providing enhanced access of electrical components disposed on the second member around the fixed structure when the second member is disposed in the second position.

17 Claims, 7 Drawing Sheets

MOVABLE ELECTRICAL POWER DISTRIBUTION ASSEMBLY

FIELD OF THE INVENTION

The present disclosure relates generally to electrical power distribution systems, more particularly, to movable power distribution systems.

BACKGROUND OF THE INVENTION

Electrical power distribution to electrical circuits is required for operation of systems and subsystems of devices such as automobiles. Components required for power distribution typically include various electrical components such as fuses, relays, diodes, circuit breakers etc., which are usually housed in one container or box for connection to the battery, alternator and a master wire harness. The number and type of electrical components required for power distribution depends upon the electrical requirements of the particular automobile.

To enhance the appearance of the automobile, it is typically desirable to conceal electrical components from normal viewing by passengers, such as by positioning the electrical components within panels, e.g., the dashboard, or other locations remote from the driver and passengers. Unfortunately, locating the electrical components in such locations substantially increases the difficulties associated with accessing the electrical components.

What is needed is a power distribution construction that simplifies access to the electrical components associated with power distribution.

SUMMARY OF THE INVENTION

The present invention relates to an electrical power distribution assembly for providing enhanced access includes a first member configured to be mounted to a fixed structure. A second member is configured to receive electrical components for interconnection to electrical systems of a predetermined configuration. The second member is movably connected to the first member between a first position and a second position. The movable connection providing enhanced access of electrical components disposed on the second member around the fixed structure when the second member is disposed in the second position.

The present invention further relates to an electrical power distribution assembly configured for use in a panel of a powered transportation apparatus. The power distribution includes a first member connected to the panel and a second member configured to receive electrical components for interconnection to electrical systems of a predetermined configuration. The second member is movably connected with the first member between a first position and a second position. The movable connection providing enhanced access of electrical components disposed on the second member from the panel when the second member is disposed in the second position The present invention further relates to a method of accessing electrical components of an apparatus. The method includes providing the apparatus including a panel having an opening, the panel substantially surrounding an electrical power distribution assembly in a first position. The electrical power distribution assembly includes a first member connected to the apparatus and a second member movably connected to the first member between a first position and a second position. At least a portion of the second member extends through the opening in the second position, the second member being configured to receive electrical components for interconnection to electrical systems of a predetermined configuration. The method further includes selectively moving the second member from the first position to the second position to access the electrical components through the opening.

An advantage of the present invention is that the electrical power distribution assembly which is normally concealed permits visual access of electrical components of electrical systems without special tools.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

Wherever possible, the same reference numbers will be used throughout the drawings to refer to the same or like parts.

DETAILED DESCRIPTION OF THE INVENTION

Figure 1:
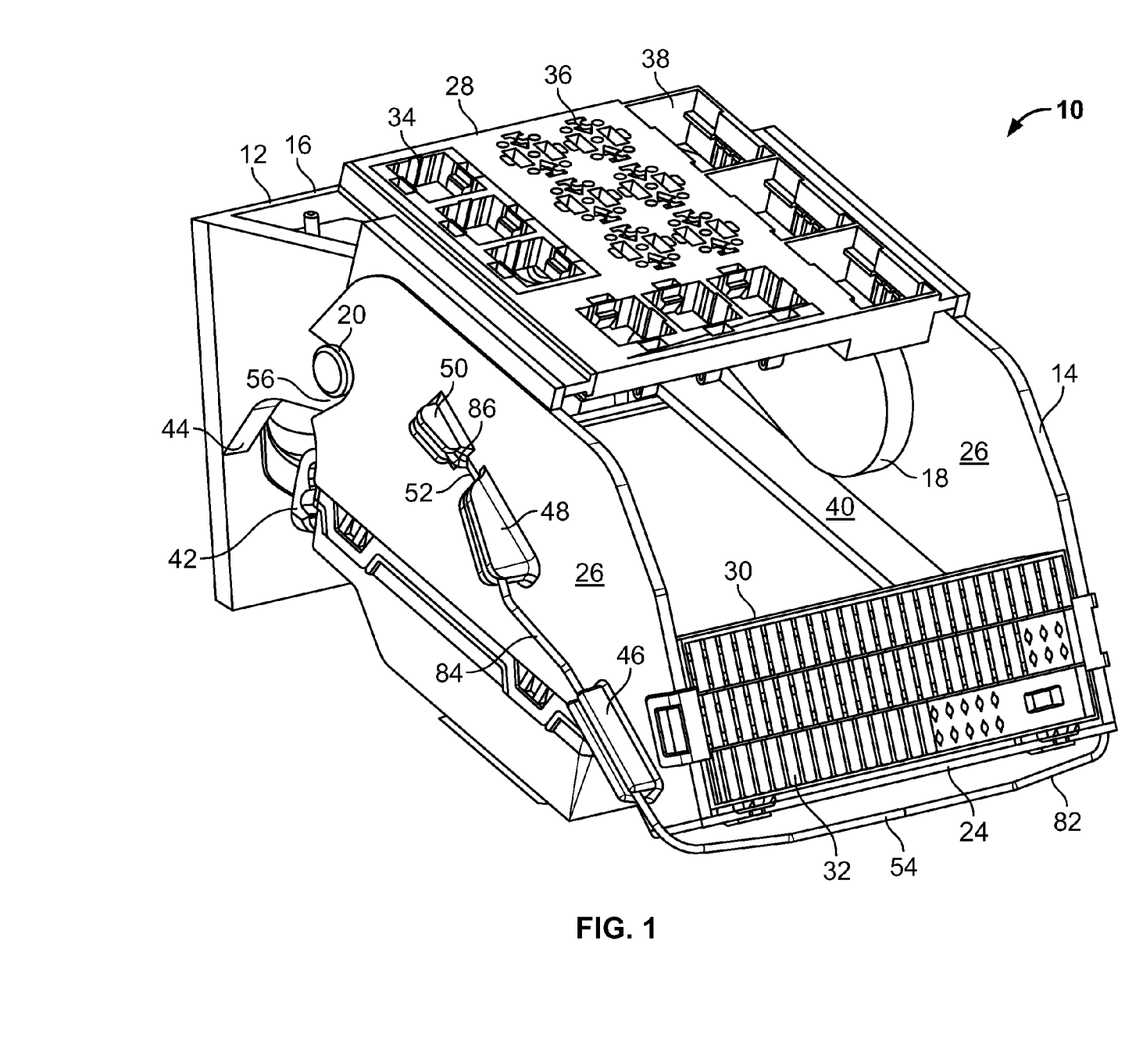
FIGS. 1 and 2 are opposed top perspective front views of an embodiment of an electrical power distribution assembly of the present invention.
Figure 5:
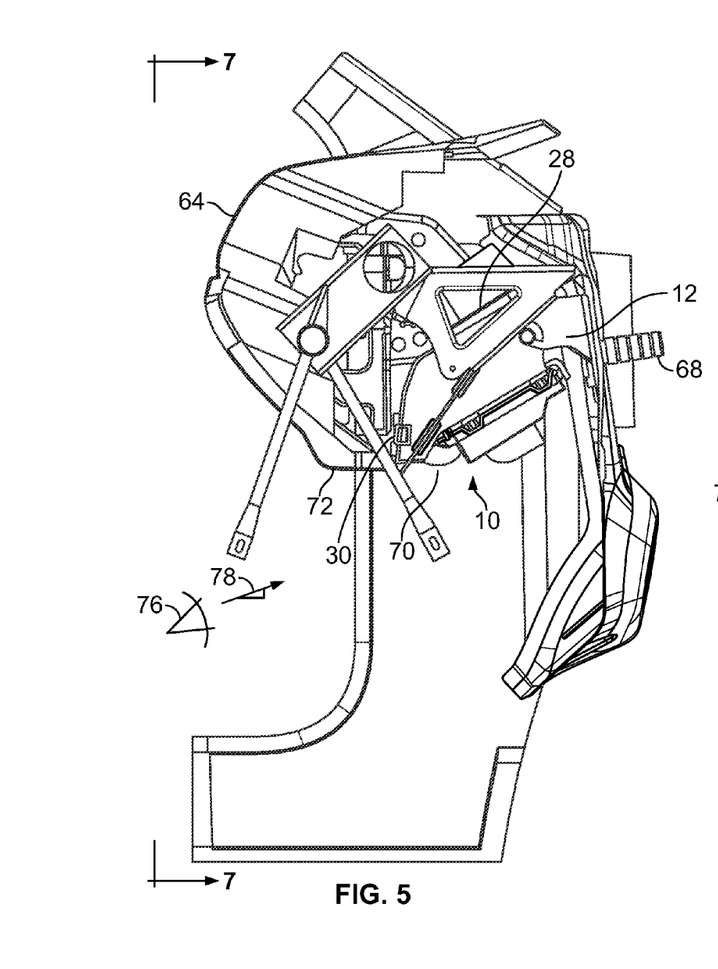
FIG. 5 is a side view of an installed embodiment of an electrical power distribution assembly of the present invention in a closed position.
Figure 6:
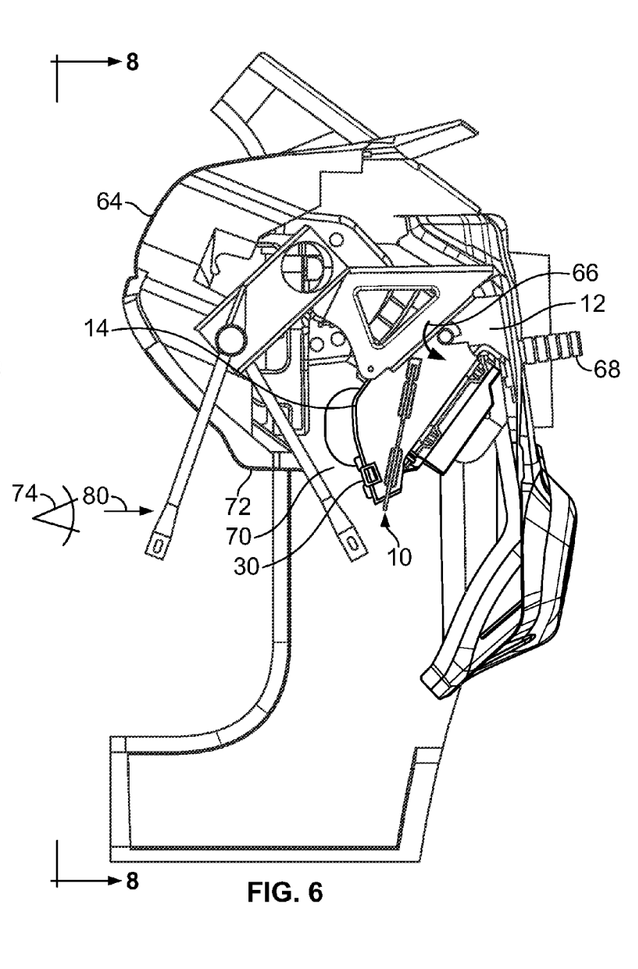
FIG. 6 is a side view of an installed embodiment of an electrical power distribution assembly of the present invention in an open position.
Figure 9:
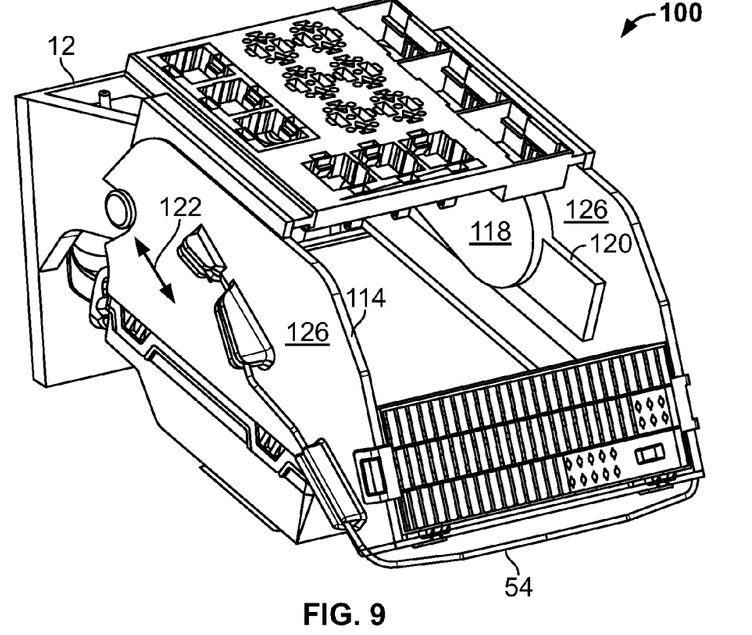
FIGS. 9 and 10 are opposed top perspective front views of an alternate embodiment of an electrical power distribution assembly of the present invention.

Referring to FIGS. 1 and 9 are exemplary embodiments of electrical power distribution assemblies 10, 100 according to the present invention for use with providing for operation of systems and subsystems of devices such as automobiles. As shown in FIG. 5, electrical power distribution assembly 10 is substantially surrounded and contained within panel 64, effectively concealing electrical power distribution assembly 10 from view by an operator or passengers (not shown) of the automobile. As will be discussed in further detail below and as shown by FIGS. 5 and 6, a novel selective movable connection between a first or fixed member 12 and a second or movable member 14 of electrical power distribution assembly 10 provides access to electrical components associated with power distribution. In other words, by virtue of the selective movable connection, electrical components mounted on electrical power distribution assembly 10 may be accessed.

The term access is intended to mean that electrical components may be more easily reached, such as by an operator or technician for maintenance or troubleshooting purposes. For example, as shown in the exemplary embodiment in FIGS. 6 and 8, at least a portion of electrical components mounted on a bridging portion 30 of electrical power distribution assembly 10 is visually perceptible from a front view (FIG. 8) of an installed embodiment of electrical power distribution assembly 10. That is, from a vantage point 74 vertically positioned at or below a lower surface 72 of panel 64 and a substantially horizontal viewing direction 80, e.g., achievable from a kneeling position outside of the automobile, electrical components mounted on bridging portion 30 (FIG. 8) may be directly viewed, simplifying identification and accessibility of electrical components. Such visual access is not available in FIG. 5, even if a vertically lower vantage point 76 and an upwardly directed viewing direction 78 were employed. However, it is to be understood that the term access is not limited to require such direct visual perception of electrical components mounted on the power distribution assembly.

Figure 2:
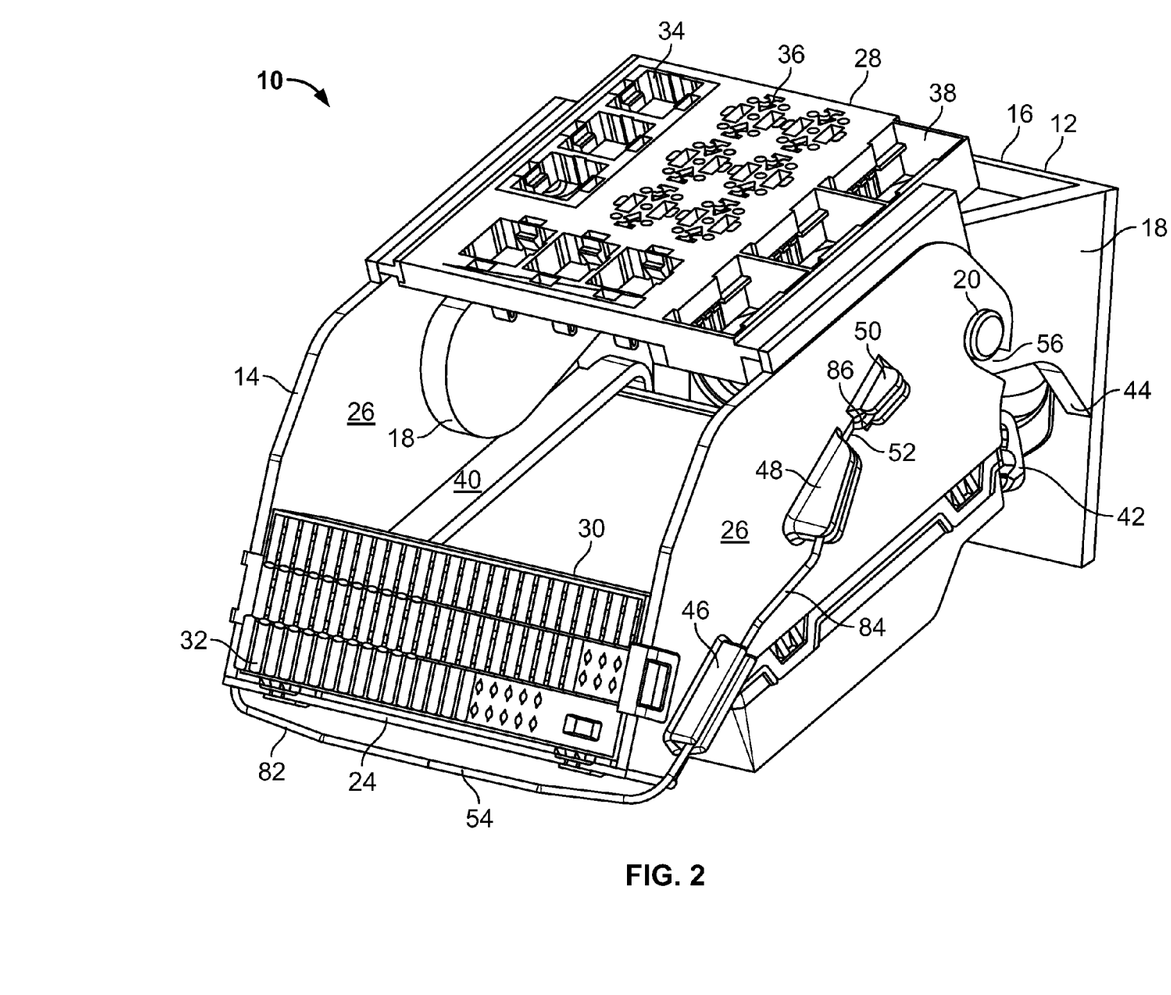

FIGS. 1 and 2 show opposed top perspective front views of electrical power distribution assembly 10. Electrical power distribution assembly 10 includes fixed member 12 that is movably connected to movable member 14. As better shown in FIGS. 3 and 4, fixed member 12 includes a base 16 disposed between a pair of ears 18. A grommet 58 overlies base 16 and includes a plurality of apertures 60 formed in grommet 58. Apertures (not shown) are also formed in base 16 that are aligned with apertures 60 for collectively receiving fasteners (not shown) therethrough to secure fixed member 12 to panel 64, which may be connected to or may be included in part of the automobile frame or other fixed structure. Grommet 58 further includes a tube portion 68 for receiving a wiring harness (not shown) connecting power distribution components mounted on electrical power distribution assembly 10 with systems and subsystems of the automobile. A knob 20, including a neck 22 extends from opposed outwardly facing surfaces of ears 18 to provide a pivotable connection with movable member 14. A slot 62 is also formed in each opposed outwardly facing surface of ears 18 for use with locking device 54 (FIG. 1) which will be discussed in additional detail below.

Figure 4:
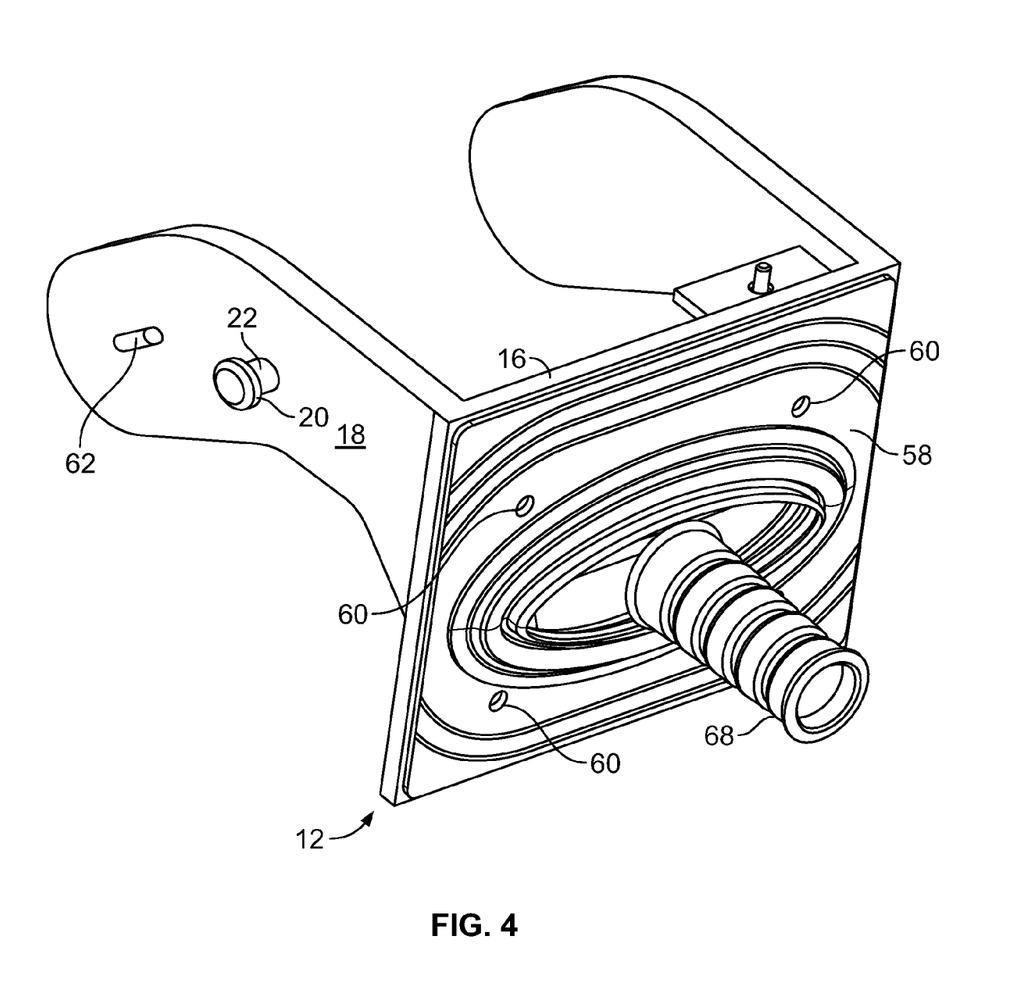
FIG. 4 is an opposed top perspective rear view of a stationary member of the electrical power distribution assembly of FIG. 3.

FIGS. 1 and 2 further show movable member 14. Movable member 14 includes a bridging portion 24 disposed between a pair of substantially parallel arms 26. In one embodiment, arms 26 may be nonparallel. Additional bridging portions 30 and 28 are similarly disposed between arms 26, with bridging portion 30 including a snap-in interface with corresponding regions of arms 26. In one embodiment, bridging portions 24, 28, 30 may be contiguous, i.e., movable member 14 and any bridging portions are of unitary construction. Bridging portions 28, 30 include openings 32, 34, 36, 38 which are configured to receive corresponding electrical components, including, but not limited to fuses, relays, diodes and circuit breakers that are connected to the automobile's various systems/subsystems via the electrical harness (not shown) that would extend through tube portion 68 of grommet 58 as shown in FIG. 4.

Figure 3:
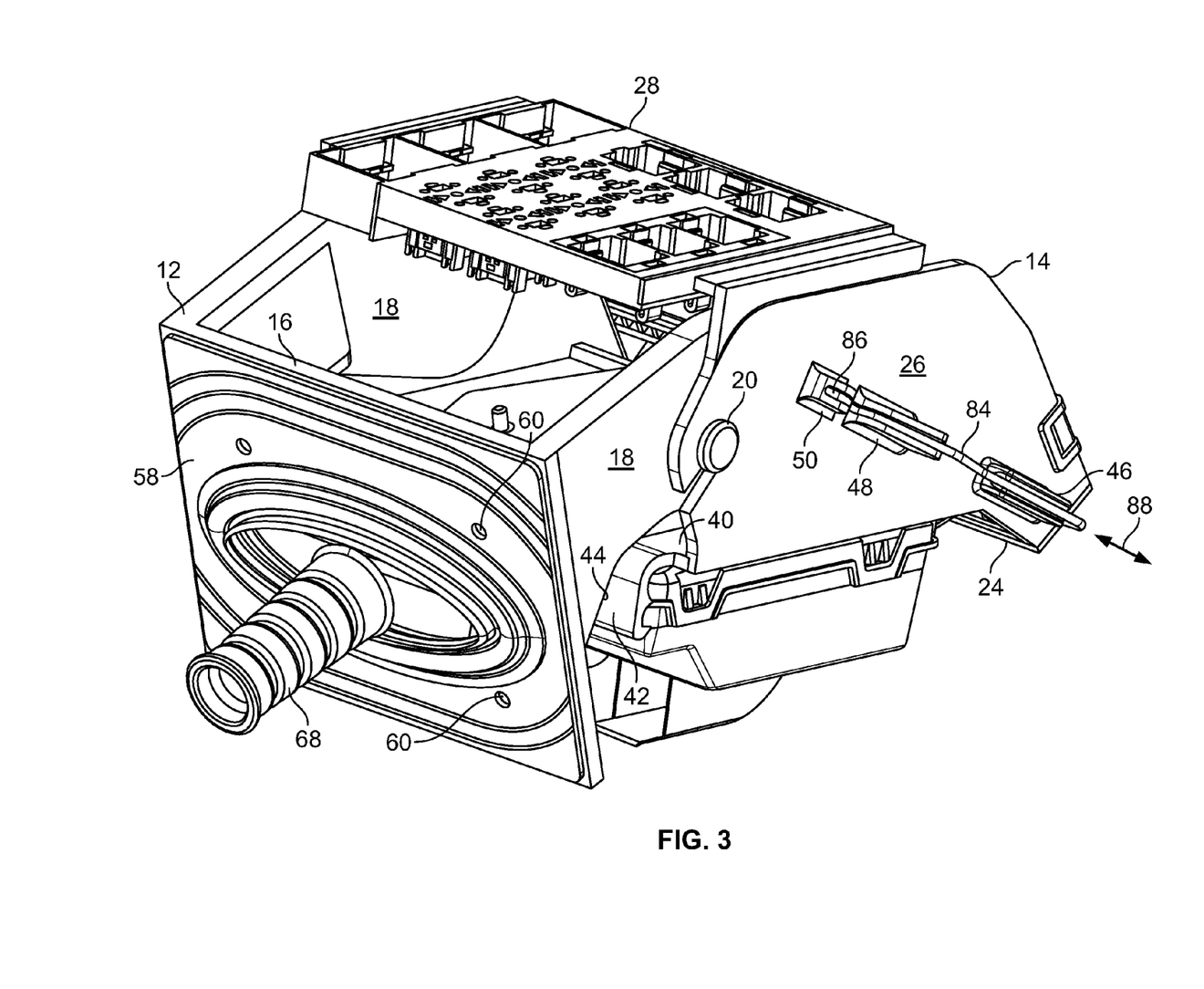
FIG. 3 is a top perspective rear view of the electrical power distribution assembly of FIG. 2 rotated 180 degrees about a vertical axis.

As further shown in FIGS. 1-3, each arm 26 further includes a slot 56 configured for receiving neck 22 of knob 20 (FIG. 4) of fixed member 12. Corresponding pairs of mated slots 56 and necks 22 form a pivotable connection between fixed member 12 and movable member 14. A set of guides 46, 48, 50 are formed in opposed outwardly facing surfaces of arms 26 and configured to receive locking device 54. Locking device 54 controls the relative orientation or angular position between fixed member 12 and movable member 14. Locking device 54 is substantially U-shaped, including a base 82 extending at each end to a leg 84, although in alternate embodiments, locking device 54 may define different geometric construction. Thus, legs 84 of locking device 54 are received in corresponding guides 46, 48, 50 of movable member 14. The dimensions between legs 84 of the uninstalled locking device 54 are less than the distance between corresponding guides 46, 48, 50. In other words, legs 84 of locking device 54 are stretched slightly apart in the installed position of the locking device 54.

In the installed position, ends 86 of legs 84 of locking device 54 opposite base 82 apply a compressive force to arm 26 of movable member 14 due to the shape retention forces present in locking device 54. When locking device 54 is positioned as shown in FIGS. 1 and 2, ends 86 extend into slots 52 formed in arm 26. Further, when slots 62 (one slot 62 shown in FIG. 4) of fixed member 12 are aligned with corresponding slots 52 in arm 26, the retention forces urge ends 86 to further extend through slots 52 and into slots 62. After ends 86 are extended into slots 62, the relative position/orientation of fixed member 12 and movable member 14 are fixed with respect to each other. This position defines a first or closed position. Upon application of sufficient force to locking device 54 in a direction 88 (FIG. 3) away from the electrical power distribution assembly 10, end 86 is retracted from slots 52, 62, permitting pivotable movement of movable member 14 with respect to fixed member 12. Pivotable or rotational movement of movable member 14 in a rotation direction 66 is shown in FIG. 6. The force applied in direction 88 (FIG. 3) is a manually applied force of a magnitude easily generated using one hand. Another limit of pivotable movement of movable member 14 is reached when an end 42 of a stiffener 40 extending from movable member 14 abuts a surface 44 of ear 18 of fixed member 12 proximate the junction between base 16 and ear 18. This position defines a second or open position. In an alternate embodiment, multiple open positions may be provided.

Figure 7:
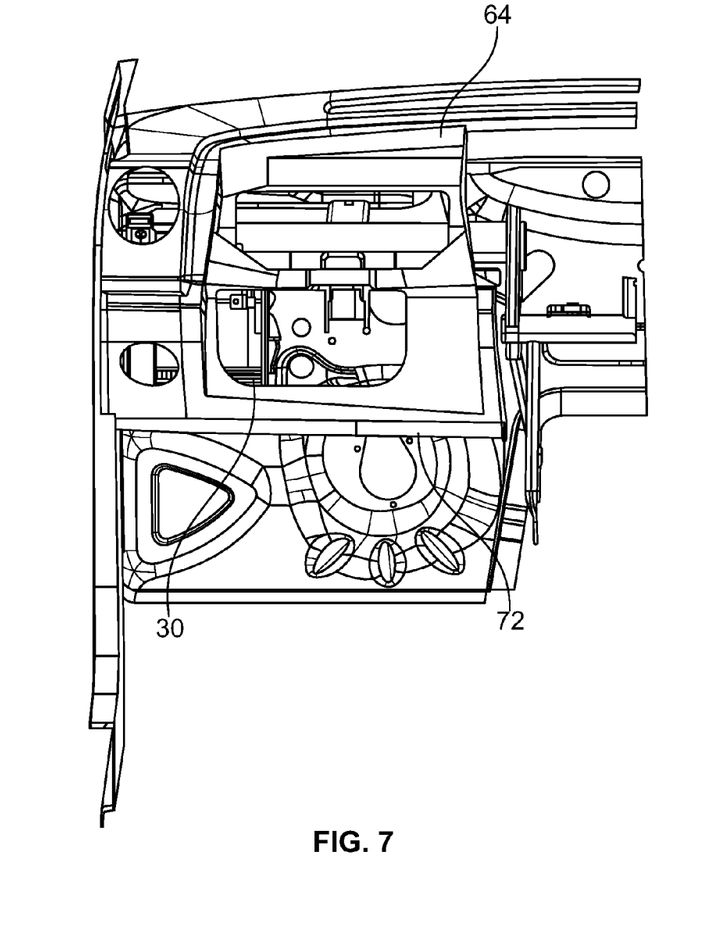
FIG. 7 is a front partial cutaway view of an installed embodiment of an electrical power distribution assembly of the present invention in a closed position.

FIGS. 5 and 7 show electrical power distribution assembly 10 disposed in the first or closed position in panel 64. As shown, electrical power distribution assembly 10 is surrounded by and entirely contained within panel 64. For example, as shown in FIG. 7, which is a front partial cutaway view of installed electrical power distribution assembly 10, no portion of electrical power distribution assembly 10 extends below lower surface 72 of panel 64. That is, electrical power distribution assembly 10 would be totally concealed in a front view of FIG. 7 taken along line 7-7 of FIG. 5. In the first or closed position of electrical power distribution assembly 10 as shown in FIG. 5, even employing a low vantage point 76 with an upwardly directed viewing direction 78 through opening 70 of panel 64 does not permit visual access of any of the electrical components mounted on bridging portions 28, 30.

Figure 8:
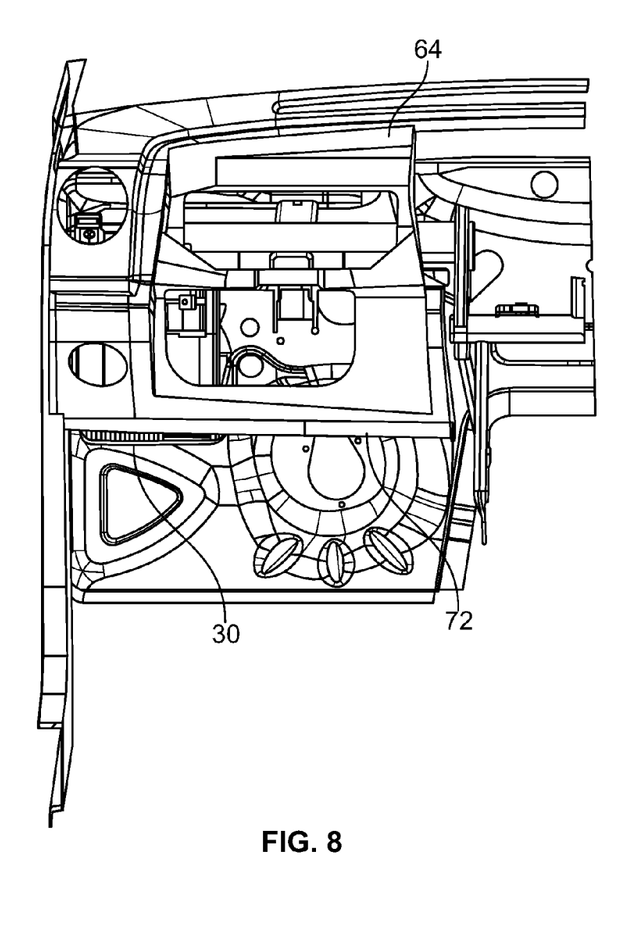
FIG. 8 is a front partial cutaway view of an installed embodiment of an electrical power distribution assembly of the present invention in an open position.

In comparison to FIGS. 5 and 7, FIGS. 6 and 8 show electrical power distribution assembly 10 disposed in the second or open position in panel 64. The second or open position of electrical power distribution assembly 10 is equivalent to the first or closed position of electrical power distribution assembly 10 (FIG. 5) after rotation of movable member 14 in a rotational direction 66 as previously discussed. As shown in FIG. 6, a portion of electrical components mounted on bridging portion 30 of electrical power distribution assembly 10 extends through opening 70 of panel 64. For example, as shown in FIG. 8 taken along line 8-8 of FIG. 6, which is a front view of installed electrical power distribution assembly 10, a portion of electrical components mounted on bridging portion 30 of electrical power distribution assembly 10 protrudes through opening 70 and extends below lower surface 72 of panel 64. In the second or open position of electrical power distribution assembly 10, employing a higher vantage point 74 with a horizontally directed viewing direction 80, as compared with vantage point 76 with an upwardly directed viewing direction 78 (FIG. 5), a portion of the electrical components mounted on bridging portion 30 is visually accessible.

Figure 10:
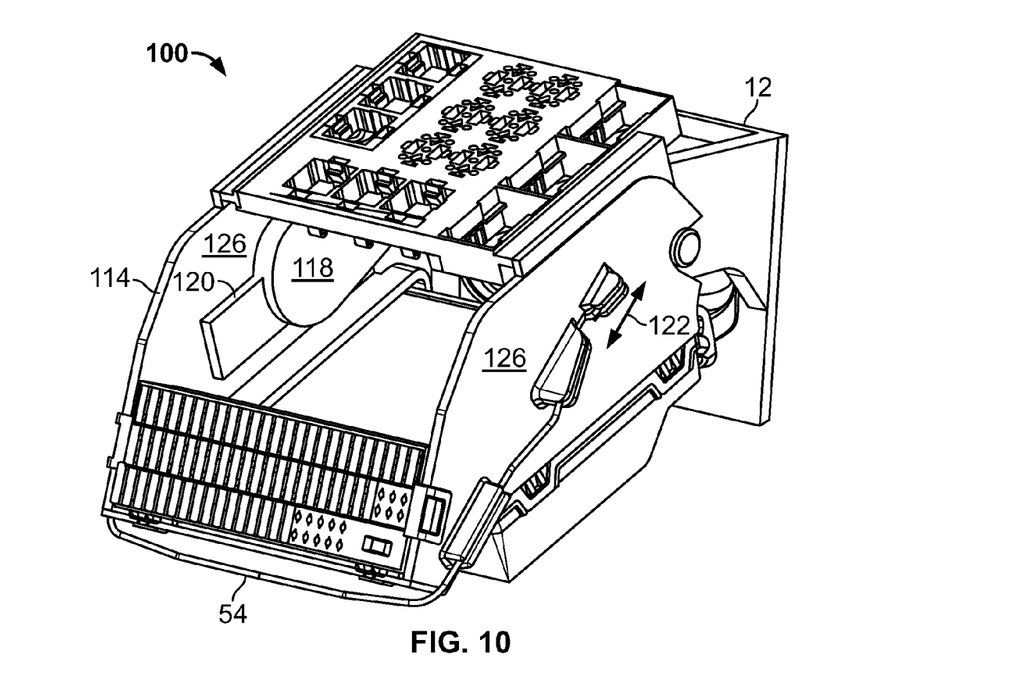

FIGS. 9 and 10 show opposed top perspective front views of an alternate embodiment of an electrical power distribution assembly 100 that is otherwise similar to electrical power distribution assembly 10, except as shown. In this alternate embodiment, each ear 118 includes a track 120 having features for engaging mating corresponding features of arms 126. Upon sufficient movement of locking device 54 along direction 122 away from electrical power distribution assembly 100, movable member 114, which is movably connected to fixed member 12, moves along track 120. It is to be understood that track 120 may define a slidable connection, a pivotable connection, or a combination thereof.

It is to be understood that alternate features may be used to provide the pivotable connection between fixed member 12 and movable member 114. For example, a knob or other protrusion may extend from movable member 114 instead of from fixed member 12, fasteners may extend through both members 12, 114, acting as a pivot axis or other arrangement that provides a pivotable connection between the members 12, 114.

In the exemplary embodiment, the magnitude of rotational movement between the open and closed positions is about 23 degrees, although the magnitude of rotation movement required or desired in other applications (as well as slidable movement) may vary significantly from this amount. In addition, movement may include slidable movement by itself or in combination with pivotable movement. Finally, in an alternate embodiment, the capability for multiple open positions, such as multiple slots, are provided, permitting access to electrical components disposed along different portions of the movable member.

It is to be understood that the movable electrical power distribution assembly may be used on other apparatus than automobiles in which access to power distribution components with electrical systems and subsystems of the apparatus is desirable. For example, this invention may be used with any vehicle having a frame supporting a propulsion device and electrical systems for use with electrical components of the vehicle, such as an automobile, boat, airplane, train or other powered transportation apparatus. Further, it is also to be understood that it is not necessary that the electrical power distribution assembly be concealed from view in the closed position, as space-savings of itself, i.e., without consideration for aesthethics, may warrant a movable electrical power distribution assembly.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An electrical power distribution assembly for providing enhanced access to electrical components selected from the group of fuses, relays, diodes and circuit breakers, the electrical power distribution assembly comprising:
   a first member mounted to a panel;
   a second member having the electrical components for interconnection to electrical systems of a predetermined configuration; and
   wherein the second member is movably connected to the first member between a first position, in which the electrical power distribution assembly is entirely contained within the panel, and a second position, in which a portion of the electrical power distribution assembly extends through an opening of the panel, the movable connection providing enhanced access of the electrical components disposed on the second member around the panel when the second member is disposed in the second position, the electrical components remaining electrically connected to respective systems via an electrical harness when the second member is provided in either the first position or the second position.

2. The power distribution assembly of claim 1, wherein the first and second members are pivotably connected to each other.

3. The power distribution assembly of claim 1, wherein the first and second members are slidably connected to each other.

4. The power distribution assembly of claim 1, wherein the second member is of unitary construction.

5. The power distribution assembly of claim 1, wherein the second member includes a snap-in interface configured to receive electrical components.

6. The power distribution assembly of claim 1, wherein the first member includes a pair of ears including features configured for movably connecting the first and second members.

7. The power distribution assembly of claim 1, further including a locking device manually actuable between a locked position and an unlocked position, the locking device disposed in the locked position maintaining the first and second members in the first position.

8. An electrical power distribution assembly for providing enhanced access to electrical components selected from the group of fuses, relays, diodes and circuit breakers, the electrical power distribution assembly configured for use in a panel of a powered transportation apparatus, the electrical power distribution assembly comprising:
   a first member connected to the panel; and
   a second member having electrical components thereon for interconnection to electrical systems of a predetermined configuration; and
   wherein the second member is movably connected with the first member between a first position, in which the electrical power distribution assembly is entirely contained within the panel, and a second position, in which a portion of the electrical power distribution assembly extends from the panel, the movable connection providing enhanced access of electrical components disposed on the second member from the panel when the second member is disposed in the second position, the electrical components remaining electrically connected to respective systems via an electrical harness when the second member is provided in either the first position or the second position.

9. The power distribution assembly of claim 8, wherein the panel having an opening substantially surrounds the electrical power distribution assembly disposed in the first position.

10. The power distribution assembly of claim 9, wherein a portion of the second member disposed in the second position extends through the opening.

11. The power distribution assembly of claim 8, wherein the first and second members are pivotably connected to each other.

12. The power distribution assembly of claim 8, wherein the first and second members are slidably connected to each other.

13. The power distribution assembly of claim 8, wherein the panel is connected to a frame of a powered transportation apparatus.

14. The power distribution assembly of claim 8, wherein the second member is of unitary construction.

15. The power distribution assembly of claim 8, wherein the first member includes a pair of ears including features configured for movably connecting with the second member.

16. The power distribution assembly of claim 8, further including a locking device manually actuable between a locked position and an unlocked position, the locking device disposed in the locked position maintaining the first and second members in the first position.

17. A method of accessing electrical components, selected from the group of fuses, relays, diodes and circuit breakers, of an electrical power distribution assembly configured for use in a panel of a powered transportation apparatus, the steps comprising:

provoding the apparatus including the panel having an opening, the panel substantially surrounding the electrical power distribution assembly in a first position, the electrical power distribution assembly comprising a first member connected to the apparatus and a second member movably connected to the first member between a first position, in which the electrical power distribution assembly is entirely contained within the panel, and a second position, in which a portion of the electrical power distribution assembly extends from the panel through the opening of the panel, the second member configured to receive electrical components for interconnection to electrical systems of a predetermined configuration;

selectively moving the second member from the first position to the second position to access the electrical components through the opening; and continuing the electrical connection between the electrical components and respective systems via an electrical harness when the second member is provided in either the first position or the second position, thereby allowing for repair, replacement, maintenance or troubleshooting of the electrical components when the second member is in either the first position or the second position.

* * * * *